United States Patent [19]

Johnson et al.

[11] Patent Number: 5,108,116

[45] Date of Patent: Apr. 28, 1992

[54] LAMINATED FINGER SEAL WITH LOGARITHMIC CURVATURE

[75] Inventors: Mark C. Johnson, Phoenix; Eric G. Medlin, Tempe, both of Ariz.

[73] Assignee: Allied-Signal Inc., Morris Township, Morris County, N.J.

[21] Appl. No.: 708,150

[22] Filed: May 31, 1991

[51] Int. Cl.⁵ .............................. F16J 15/447
[52] U.S. Cl. ........................ 277/53; 277/193; 415/174.5
[58] Field of Search ............ 277/53, 58, 152, 193, 277/236; 415/173.1, 173.3, 173.5, 174.2, 174.3

[56] References Cited

U.S. PATENT DOCUMENTS

| | | | |
|---|---|---|---|
| Re. 30,206 | 2/1980 | Ferguson et al. | 277/53 X |
| 885,032 | 4/1908 | De Ferranti | 277/53 X |
| 2,124,108 | 7/1938 | Grece | |
| 2,233,579 | 4/1941 | Bowers | 277/235 R X |
| 2,571,817 | 10/1951 | Armstrong | 48/176 |
| 2,699,349 | 1/1955 | Browniee | |
| 3,199,878 | 8/1965 | Cunningham et al. | 277/88 |
| 3,381,969 | 5/1968 | Crow et al. | 277/117 |
| 3,411,794 | 11/1968 | Allen | 277/53 X |
| 3,460,842 | 8/1969 | Pointer et al. | 277/53 X |
| 3,719,365 | 3/1973 | Emmerson et al. | 277/53 |
| 3,744,805 | 7/1973 | Heinrich | 277/96 |
| 3,843,278 | 10/1974 | Torell | 277/230 X |
| 3,880,435 | 4/1975 | Thornbald | 277/53 |
| 3,970,319 | 7/1976 | Carroll et al. | 277/53 |
| 4,202,554 | 5/1980 | Snell | 277/153 |
| 4,358,120 | 11/1982 | Moore | 277/192 |
| 4,415,317 | 11/1983 | Butterworth | 277/204 X |
| 4,600,202 | 7/1986 | Schaeffler et al. | 277/53 |
| 4,645,217 | 2/1987 | Honeycutt et al. | 277/230 |
| 4,678,113 | 7/1987 | Bridges et al. | 277/53 X |
| 4,696,480 | 9/1987 | Jornhagen | 277/53 |
| 4,756,536 | 7/1988 | Belcher | 277/53 |
| 4,770,424 | 9/1988 | Otto | 277/53 X |
| 4,781,530 | 11/1988 | Lauterbach et al. | 415/170 R |
| 4,940,080 | 7/1990 | Reeves et al. | 277/53 X |
| 5,031,922 | 7/1991 | Heydrich | 277/53 |
| 5,042,823 | 8/1991 | Mackay et al. | 277/57 X |

FOREIGN PATENT DOCUMENTS

| | | |
|---|---|---|
| 554053 | 7/1932 | Fed. Rep. of Germany . |
| 626541 | 2/1936 | Fed. Rep. of Germany . |
| 1300449 | 6/1962 | France . |
| 1308424 | 9/1962 | France . |
| 2021209 | 5/1979 | United Kingdom . |

OTHER PUBLICATIONS

Brushes as High Performance Gas Turbine Seals (J. G. Ferguson) Jun. 6, 1988.

Primary Examiner—William A. Cuchlinski, Jr.
Assistant Examiner—James K. Folker
Attorney, Agent, or Firm—Jerry J. Holden; James W. McFarland; Robert A. Walsh

[57] ABSTRACT

An annular sealing apparatus comprised of at least a pair of axially stacked thin diaphragm members is provided. Each of diaphragm members includes a planar array of radially extending fingers separated by gaps. The fingers have a logarithmic curvature as they extend from their innermost end to their outermost end. The fingers also have a constant thickness along their length and also have a foot integral with their innermost end. This foot is wider than the fingers and thereby provides a larger wear surface. The pair of diaphragm members are disposed so that the fingers of each block the gaps of the other.

7 Claims, 2 Drawing Sheets

LAMINATED FINGER SEAL WITH LOGARITHMIC CURVATURE

TECHNICAL FIELD

This invention relates generally to sealing devices disposed in association with two relatively rotatable members and providing a fluid seal therebetween. More particularly, the present invention relates to an apparatus for achieving sealing between a rotatable shaft and a housing circumscribing the rotatable shaft.

BACKGROUND OF THE INVENTION

This application is related to U.S. Pat. Nos. 5,042,823, 5,031,922 and 5,071,138. All three patents are assigned to the same assignee.

Sealing members, or fluid packing, of the so-called brush type for use at the interface of a housing and rotatable shaft have been known for a long time. For example, U.S. Pat. No. 885,032, issued to S. Z. De Ferranti on Apr. 21, 1908 (hereinafter, the '032 patent), is believed to teach a fluid packing or brush seal for use in an elastic turbine wherein a plurality of elongate filaments or fibers are clustered together and secured to one of a pair of relatively movable members for sliding contact with the other member. The resulting "brush" seal functions rather like a labyrinth or multi-baffle seal to inhibit fluid flow between the pair of relatively movable members. The '032 patent teaches that the brush seal may be made of metallic filaments or wire, for example, carried by one of the members and may be arranged as a radial or axial seal with a smooth or grooved engagement surface on the other of the pair of members. Consequently, the brush seal of the '032 patent is able to withstand high temperatures encountered in steam turbines or combustion turbine engines.

A more recent example of the brush seal is taught by U.S. Pat. No. 4,678,113, issued Jul. 7, 1987, to S.A. Bridges and J. Goddard, (hereinafter the '113 patent). The '113 patent is believed to teach a brush seal wherein a plurality of filaments are adhesively intersecured to form a tuft. A single row of tufts are assembled closely adjacent one another in a support member with part of each tuft projecting therefrom. The adhesive is removed from the projecting part of each tuft to leave the filaments individually movable for sealing engagement with a rotatable shaft. The filaments may be made of wire so that the brush seal is suitable for high temperature applications.

Finally, a brush seal of multiple stages is taught by U.S. Pat. No. 4,756,536, issued Jul. 12, 1988 to Bryan L. Belcher, (hereinafter, the '536 patent). This patent is believed to provide a multistage brush seal for use in a turbine engine wherein the fluid pressure differential imposed across the seal would result in the last seal stage allowing excessive leakage flow.

Each of the teachings of the '032, '113, and '536 patents proposes to use plural elongate filaments in making of the brushes of a brush seal. While the techniques and industry for making general purpose brushes at high volume and low cost are well advanced, brush seals remain fairly expensive. This may be the case because the manufacturing techniques for general purpose brushes are not applicable to brush seals. On the other hand, the historically low volume of brush seal use may not economically justify adaptation of high-volume, low-cost manufacturing equipment from the general brush field to the seal making industry.

Generally speaking, high temperature brush seals, as opposed to general purpose brushes, rely on a cluster of wires packed closely together to limit leakage flow therebetween, with the brush being thick enough to minimize the overall leakage rate. In manufacturing these brush seals, a persistent problem seems to be holding of the wires in place for welding their outer ends together into the housing ring of the seal device. After this welding operation, the inner ends of the wires in the brush seal must be ground to a finished inside diameter. Of course this multistep manufacturing process for conventional brush seals adds to their cost. What ever may be the economic and technical reasons, brush seals have not enjoyed a wide application, especially in the turbine engine field. Instead, the turbine engine field has historically relied upon sometimes complex knife-edge and labyrinth sealing structures.

On the other hand, as the demands for small sizes, increased power outputs, and improved specific fuel consumptions increase in the turbine engine arts, the brush seal becomes increasingly attractive. Such is the case because the brush seal can offer an improved sealing effectiveness, smaller size, and it is hoped, a decreased engine cost when compared to engine designs using conventional labyrinth seals.

Accordingly, a need exists for a seal that is as least as effective as a conventional brush seal and can also be manufactured by modern low cost techniques.

SUMMARY OF THE INVENTION

In view of the above, it is an object for this invention to provide seal which can be manufactured by modern low-cost techniques.

Another object of the present invention is to provide a seal which has improved sealing effectiveness in comparison with conventional brush seals.

Broadly stated, an object of this invention is to provide a sealing device with more positive control of leakage flow than either conventional brush-type or labyrinth seals, and which can be manufactured with modern low-cost methods. Modern low-cost manufacturing techniques which may be used to manufacture the present inventive sealing device include photo etching, wire electrical discharge machining, and laser cutting.

The present invention achieves these objects by providing an annular sealing apparatus for disposition in cooperation with a body defining a bore and a shaft member rotatably received in said bore to inhibit fluid leakage therebetween. The sealing apparatus is comprised of axially juxtaposed first and second comb-like pluralities of uniformly spaced and integral finger members circumscribing the shaft member. Each finger member has substantially the same width and is separated from adjacent finger members by a uniform gap. Importantly, each finger member has the same logarithmic spiral as it extends from it radially innermost end to it radially outermost end. The radially innermost end having a foot for sealingly and movably engaging said shaft member. The first and second comb-like member are positioned so that the fingers of each block the gaps in the other.

These and other objects, features and advantages of the present invention are specifically set forth in or will become apparent from the following detailed descrip-

DESCRIPTION OF THE PREFERRED EMBODIMENT

Figure 1:
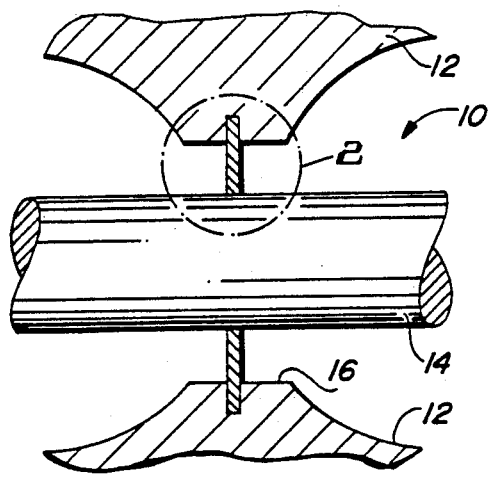
FIG. 1 depicts a longitudinal view, partially in cross-section, of a sealing apparatus embodying the invention.

Viewing FIGS. 1-5 in conjunction, FIG. 1 shows a sealing apparatus generally referenced with the numeral 10. The sealing apparatus 10 is disposed in cooperation with a body 12 and a rotatable shaft 14 to provide sealing therebetween. Particularly, the body 12 defines a bore 16 through which passes the rotatable shaft 14. The sealing apparatus 10 is carried by the body 12 at bore 16 and encircles the shaft 14 in sealing tight relatively movable relation therewith.

Figure 2:
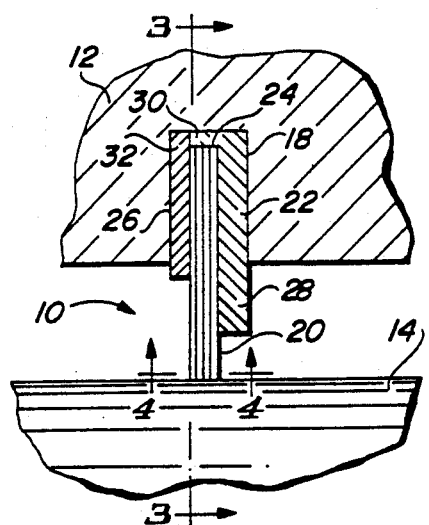
FIG. 2 depicts an enlarged fragmentary sectional view of an encircled portion of FIG. 1.

FIG. 2 shows that the sealing apparatus 10 includes an annular housing 18, which is carried by body 12 and extends toward but short of shaft 14. Carried within the housing 18 is a plurality of thin annular metallic diaphragm members 20. The housing 18 includes a first annular portion 22 which is L-shaped in cross-section to define a recess 24. Received in recess 24 is the plurality of diaphragm members 20. Also received in recess 24 is a second planar annular portion 26. Portion 24 includes a first radially extending leg 28 generally parallel with portion 26, and an axially extending leg 30 encircling the diaphragm members 20 and second portion 26. At a radially outer margin 32 of the second portion 26, the portions 22 and 26 are welded together to trap the diaphragm members 20 therebetween. Importantly, the portions 22 and 26, at their axial surfaces confronting the plurality of diaphragm members 20, diverge as they extend inwardly inwardly over a portion of their radial dimension to allow a limited relative movement of axially adjacent parts of the individual diaphragm members 20. In other words, the portions 22 and 26 of housing 18 clamp the diaphragms therebetween at their radially outer margin, but diverge slightly (in the range of 0.3 degrees) as they extend inwardly to allow slight relative movements of parts of the diaphragm members. This divergence of the portions 22 and 26 is to avoid axially pinching the diaphragm members adjacent the shaft 14. Because this divergence is so slight it is not capable of illustration in the drawings.

Figure 3:
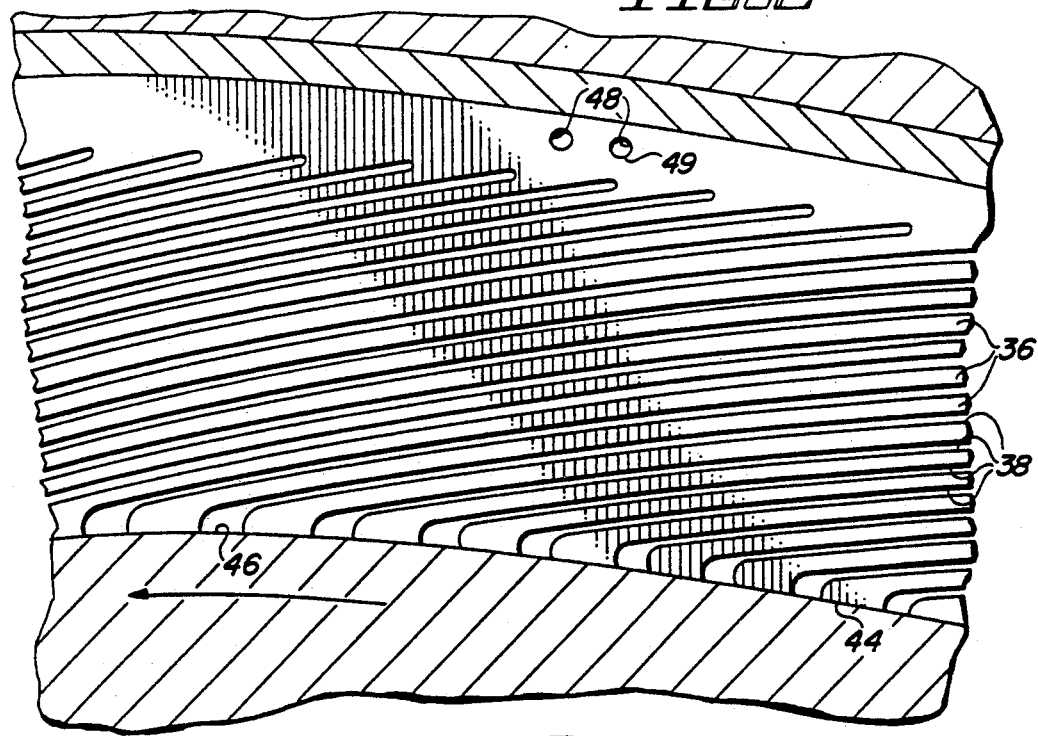
FIG. 3 depicts a transverse sectional view taken along line 3—3 of FIG. 2.
Figure 3A:
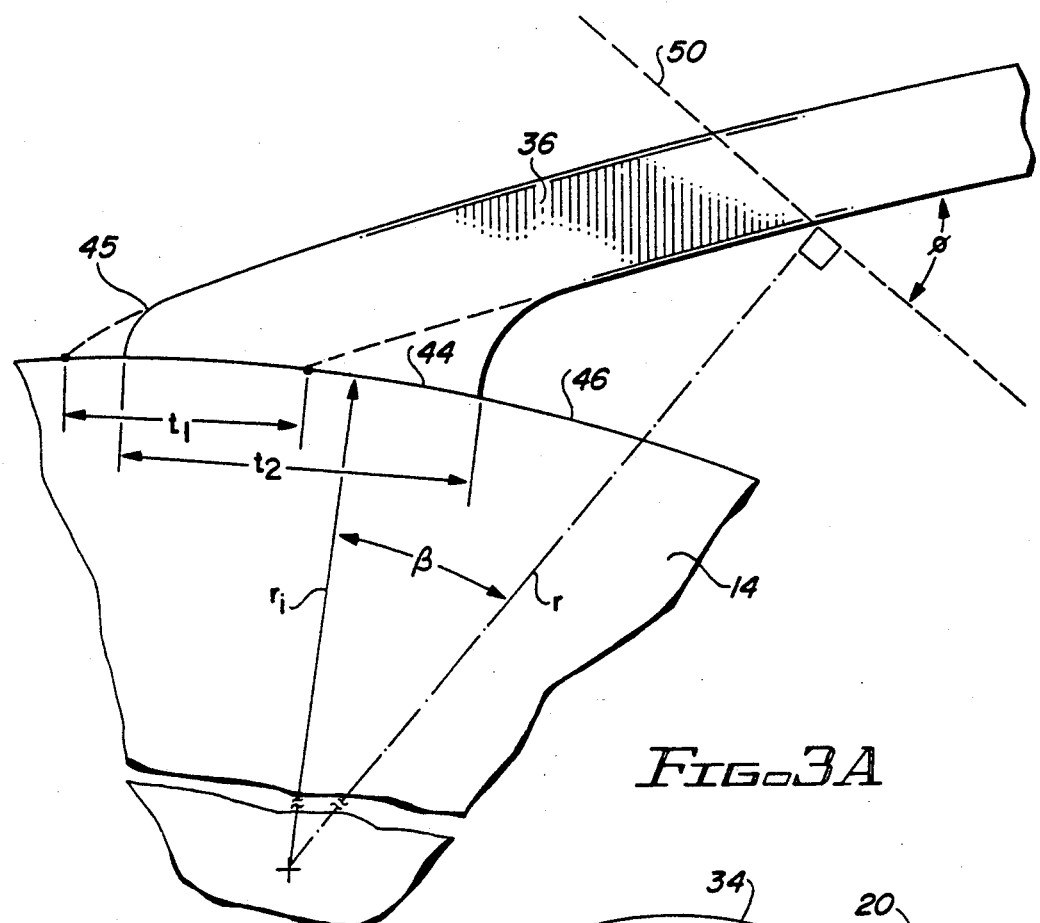
FIG. 3A depicts a portion of the transverse sectional view of FIG. 3 showing only a single finger portion.
Figure 5:
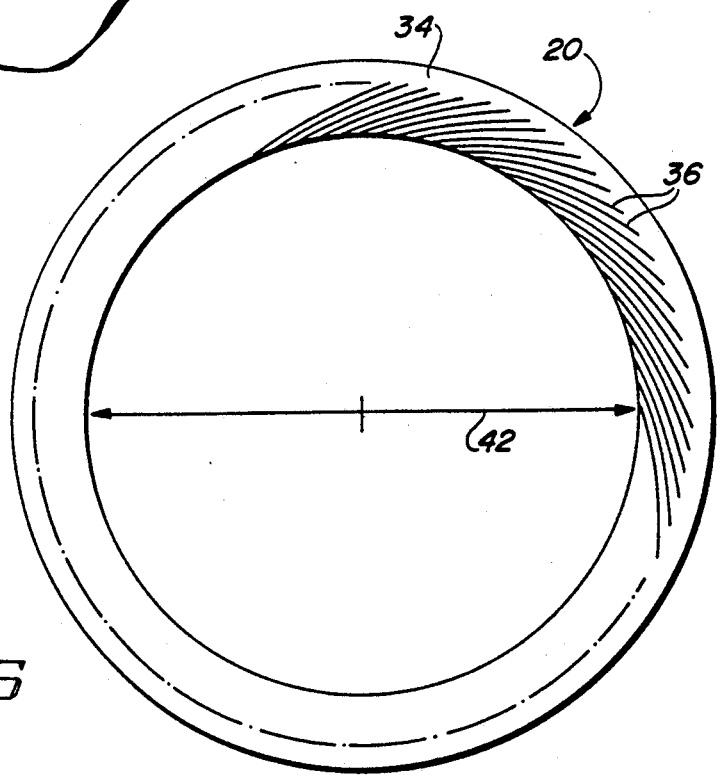
FIG. 5 depicts a single diaphragm member with only a portion of the finger members of the sealing apparatus of FIGS. 1-4.

The diaphragm members 20 each extend to and slidably engage the shaft member 14, viewing FIGS. 2 and 3 in particular. As seen in FIGS. 3, 3A, and 5, each diaphragm member 20 includes a circumferentially continuous band portion 34 which is adjacent the radially extending leg 28 of housing portion 22. The diaphragm members 20 each define an integral plurality of circumferentially uniformly arrayed finger portions 36 having about the same thickness. The finger portions 36 are circumferentially spaced apart to define a plurality of uniform gaps 38 therebetween that are narrower than the finger portions 36. The combination of the band portion 34, the finger portions 36 and the gaps 38 gives the diaphragm members 20 a comb-like configuration.

As shown in FIGS. 3 and 3A, each of the finger portions 36 has a circumferential logarithmic curvature as it extends radially outward. The curvature of each of the finger portions 36 is substantially the same. This curvature is defined by preselecting a spiral angle $\phi$ and then solving equation (1) to determine the radius r from the center of the shaft 14 at any point along the finger portion 36.

$$r/r_1 = e^{\beta \tan \phi} \tag{1}$$

In equation (1) $r_1$ is the radius from the center of the shaft 14 to the innermost end of the finger portion 36, $\beta$ is the angle between r and $r_1$ in radians, and $\phi$, the spiral angle, is the angle between the finger portion 36 and a line 50 tangent to r. It has been found that the lower the spiral angle $\phi$ the greater the flexibility of the finger portions 36.

The innermost end of each of the finger portions 36 has an integral foot portion 44 that contacts the surface 46 of the shaft 14. The foot portion 44 is rounded along its leading edge 45 to eliminate any sharp corners and has a circumferential width $t_2$ greater than $t_1$ which would be the circumferential width of the finger portion 36 if it was extended to the outer surface 46. This larger width gives the foot portion 44 a larger wear area than a finger portion without a foot portion, as taught in the copending applications.

As depicted in FIG. 5, the finger portions 36 cooperatively define an inner diameter, referenced with the numeral 42, which is slightly less than the outer diameter of shaft 14. Consequently, when the diaphragm members 20 are received about the rotating shaft 14 a running interference is created between the bottom surfaces of the foot portions 44 and the outer surface 46 of the shaft 14. This interference causes each of the finger portions 36 to slightly deflect which in turn cause the bottom surfaces of the foot portions 44 to lightly press against the outer surface 46 of shaft 14. Preferably, the outer surface 46 of shaft 14 is hard coated to reduce wear. However, because of the logarithmic spiral the finger portions 36 are more flexible than finger portions without such a spiral. This greater flexibility allows the finger portions 36 to more easily deflect thus reducing the rubbing between the foot portions 44 and the surface 46. By reducing the rubbing not only is the life of the seal increased but the heat generated by the rubbing is sufficiently reduced so that the melting of the finger portions 36 is not a concern. Also, the radial compliance of the finger portions 36 is sufficient to easily accommodate all vibratory excursions or maneuver load deflections of shaft 14. Additionally, because the foot portions 44 have a larger wear area than the finger portions, they can withstand a greater rubbing.

Referring to FIG. 3, when the shaft 14 rotates counter clockwise the tangential friction force at surface 46 provides a moment to finger portion 36 tending to decrease the perpendicular contact force between the foot portion 44 and the surface 46. Thus, the shaft 14 is rotatable counter clockwise with the finger portions 36 maintaining a smooth sliding contact with the surface 46. Should the shaft 14 rotate clockwise, the frictional force adds to the perpendicular force. However, the finger portions 36 are angularly positioned relative to the surface 46 so that a smooth sliding contact is maintained regardless of the direction of rotation of shaft 14. Additionally, because the foot portions 44 have rounded leading edges they are less likely to dig into or grab the shaft 14.

Each of the plural diaphragm members 20 defines a pair of circumferentially spaced indexing apertures 48. The spacing between apertures 48 is an odd integer multiple of one-half the circumferential spacing of fingers 36. Consequently, axially adjacent diaphragm members may be circumferentially alternated by passage of a single indexing pin 49 through alternate ones of the pair of indexing apertures. The indexing pin 49 is also received in a retention hole, not shown, in each of the housing portions 22 and 26 to prevent relative rotation of the diaphragm members 20.

Figure 4:
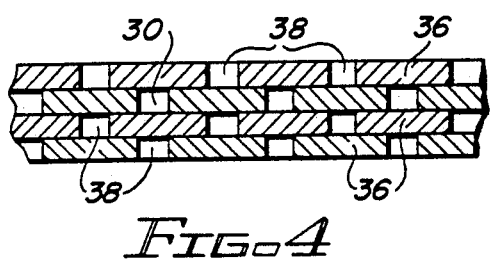
FIG. 4 provides an enlarged fragmentary cross-sectional view taken along line 4—4 of FIG. 3.

FIG. 4 illustrates the advantageous cooperative effect of the indexed circumferential orientation of adjacent diaphragm members 20. It is easily seen that because the gaps 38 are considerably narrower circumferentially than are the finger portions 36, the gaps of each diaphragm member are blocked axially by the finger portions of the axially next adjacent diaphragm member. Consequently, the axially successive finger portions act as a positive seal to prevent axial passage of fluid.

The Applicants have developed a computer model which can be used to predict the performance of the present invention as well as the performance of a conventional brush seal. The model shows that for an embodiment of the present invention having a spiral angle of 12.5 degrees and a foot portion wear area of 0.0026 square inches and a running interference with a rotating shaft of 0.010 inches, the wear factor of the finger seal is about six times smaller than the wear factor of a comparable brush seal. The wear factor being defined as the pressure of the foot portion or brush bristle on the shaft surface multiplied by the tangential velocity of the shaft. Further calculations showed that at a spiral angle of about 22 degrees the wear factor of the finger seal was similar to the wear factor of the brush seal.

Another advantage to the present invention is that it has features which allow low cost manufacturing thereof. For example, the diaphragm members 20 may be made of a thin sheet or strip stock of shape-retaining or springy metal. The manufacturing methods used may include photoetching, wire electrical discharge machining, and laser cutting. However, photoetching is the preferred method of manufacturing. The laser cutting or photoetch process may directly accept design information from a CAD/CAM system. The result is a seal apparatus which may be produced from design parameters and information in a short time and with very little or no specialized tooling. Those component parts of the seal apparatus which are not made by the photoetch process, for example, the housing portions 22 and 26, can be inexpensively made with standard tooling.

The choice of material depends on the application. For high temperatures, the preferred material would be Inconel X750. For lower temperatures, any of the Inconnel 600 series would suffice. Generally speaking, alloys with high molybdenum content would be preferred for wear resistance and low friction. In some cases, coatings such as PS200 (A composition developed by NASA) may be beneficial. For temperatures below 300° F., Polymide (plastic) diaphragms may be adequate.

Various modifications and alterations to the above described sealing apparatus will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. An annular sealing apparatus for disposition in cooperation with a body defining a bore and a shaft member rotatably received in said bore to inhibit fluid leakage therebetween, said sealing apparatus comprising a first circumferentially extending comb-like member having a plurality of uniformly spaced integral finger members, and a second circumferentially extending comb-like member also having a plurality of uniformly spaced integral finger members, said pluralities of finger members circumscribing said shaft member, said finger members defining gaps therebetween, each of said finger members having at its innermost end a foot portion sealingly and movably engaging said shaft member, said foot portion having a circumferential width greater than the circumferential width of the remainder of said finger member, said first and second comb-like members being positioned so that the fingers of each block the gaps of the other.

2. The annular sealing apparatus of claim 1 wherein said foot portions have rounded circumferential edges.

3. An annular sealing apparatus for disposition in cooperation with a body defining a bore and a shaft member rotatably received in said bore to inhibit fluid leakage therebetween, said sealing apparatus comprising a first circumferentially extending comb-like member having a plurality of uniformly spaced integral finger members, and a second circumferentially extending comb-like member also having a plurality of uniformly spaced integral finger members said pluralities of finger members circumscribing said shaft member, said finger members defining gaps therebetween, an end surface of each of said finger members sealingly and movably engaging said shaft member, each of said finger members having a logarithmic curvature as it extends radially from said end surface, said first and second comb-like members being positioned so that the fingers of each block the gaps of the other.

4. The annular sealing apparatus of claim 3 wherein said logarithmic curvature is defined by the equation, $$r/r_1 = e^{\beta \tan \phi}$$

wherein r is the radius from the center of said shaft at any point along said finger member, $r_1$ is the radius from the center of said shaft to said end surface of said finger member, $\beta$ is the angle between r and $r_1$ in radians, and $\phi$ is the angle between said finger member and a tangent to r.

5. The annular sealing apparatus of claim 4 wherein said angle $\phi$ is less than or equal to 22 degrees.

6. The annular sealing apparatus of claim 5 wherein said angle $\phi$ is about 12.5 degrees.

7. The annular sealing apparatus of claim 3 wherein said end surface of each of said finger members has a circumferential width greater than the circumferential width of the remainder of its respective finger member.

* * * * *

UNITED STATES PATENT AND TRADEMARK OFFICE
CERTIFICATE OF CORRECTION

PATENT NO. : 5,108,116
DATED : April 28, 1992
INVENTOR(S) : JOHNSON ET AL

It is certified that error appears in the above-identified patent and that said Letters Patent is hereby corrected as shown below:

Claim 3, col. 6, line 39, insert "," after "members".

Signed and Sealed this

Sixth Day of July, 1993

Attest:

MICHAEL K. KIRK

Attesting Officer

Acting Commissioner of Patents and Trademarks